No. 868,615. PATENTED OCT. 15, 1907.
R. S. McINTYRE.
SPROCKET WHEEL AND CHAIN.
APPLICATION FILED FEB. 9, 1907.
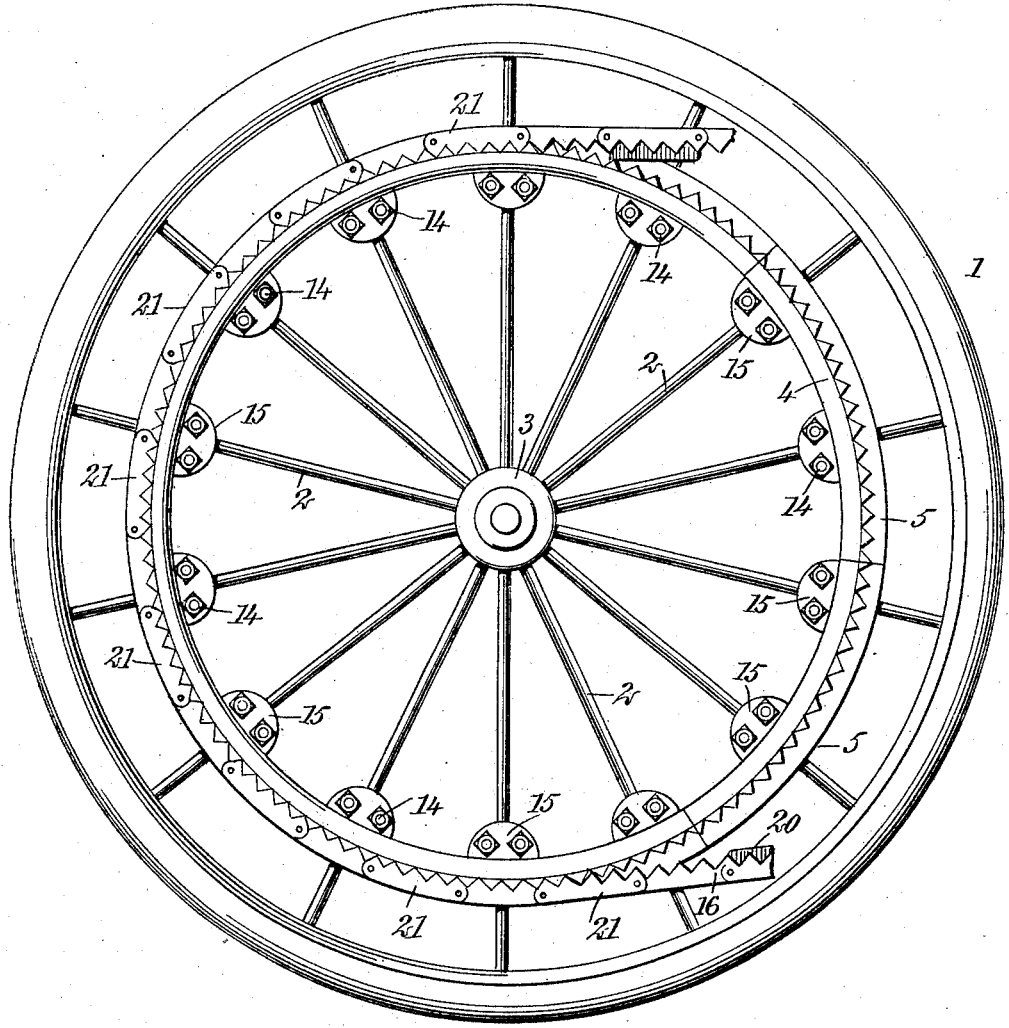
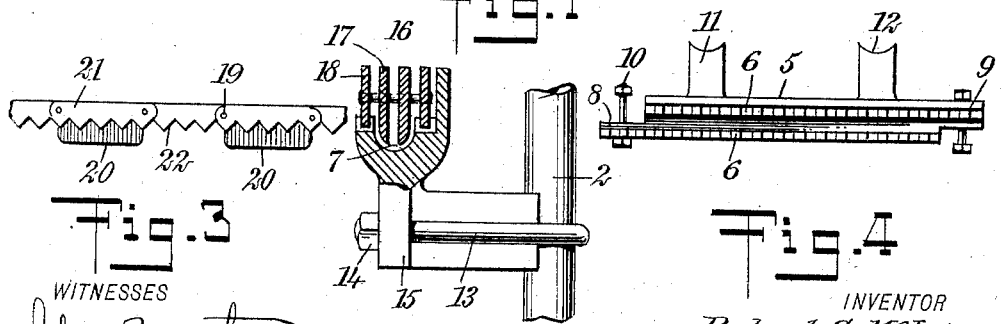
WITNESSES
INVENTOR
Robert S. McIntyre
BY
ATTORNEYS

UNITED STATES PATENT OFFICE.

ROBERT SAFFORD McINTYRE, OF RIVERSIDE, CALIFORNIA.

SPROCKET WHEEL AND CHAIN.

No. 868,615.    Specification of Letters Patent.    Patented Oct. 15, 1907.

Original application filed February 23, 1905, Serial No. 246,891. Divided and this application filed February 9, 1907. Serial No. 356,569.

*To all whom it may concern:*

Be it known that I, ROBERT SAFFORD MCINTYRE, a citizen of the United States, and a resident of Riverside, in the county of Riverside and State of California, have invented a new and Improved Sprocket Wheel and Chain, of which the following is a full, clear, and exact description.

This invention relates to sprocket wheels and chains such as used in the driving gear of automobiles or in the transmission mechanism of machinery.

The present application is a division of an application filed by me February 23, 1905, Serial Number 246,891, under the title of "Automobile driving gear."

The object of the invention is to produce a sprocket wheel and chain which will operate efficiently to transmit a rotary movement, and, further, to provide a construction which will insure that the chain will not become displaced from the wheel.

The invention consists in the construction and combination of parts to be more fully described hereinafter and particularly set forth in the claims.

Reference is to be had to the accompanying drawings forming a part of this specification, in which similar characters of reference indicate corresponding parts in all the figures.

Figure 1 is a side elevation of a sprocket wheel constructed according to my invention, and representing the same as applied to the wheel of a vehicle. A portion of the sprocket chain is represented in connection with the wheel; Fig. 2 is a cross section through the sprocket wheel and chain taken in a radial plane and illustrating a portion of one of the spokes to which the sprocket wheel is attached; Fig. 3 is a side elevation of a portion of the sprocket chain; and Fig. 4 is a plan or edge view of one of the segments out of which the sprocket wheel is formed.

Referring more particularly to the parts, 1 represents a wheel such as found in vehicles, the same being provided with spokes 2 radiating from the hub 3. Upon the spokes 2 I attach the sprocket wheel 4. This sprocket wheel is formed of a plurality of segments 5 having substantially the construction shown in Figs. 2 and 4. Each of these segments is curved about the axis of the hub as a center, so that the segments may be connected together end to end to form a complete circle or wheel. Each segment is formed with two parallel rows of sprocket teeth 6, and between them a groove or channel 7 is formed, as indicated most clearly in Fig. 2. The ends of the segments 5 are cut away so as to form projecting tongues 8 and 9. The tongue 8 at one end of each segment is disposed at one side, while the tongue 9 at the opposite end of the same segment is disposed on the opposite side. With this arrangement, the segments may be fitted together so that the tongues 9 overlap the tongues 8. The segments are then rigidly attached to the tongues 8 and 9 by means of through bolts 10 as indicated. In this way a very firm and rigid sprocket wheel is built up.

In order to attach the sprocket wheel rigidly to the wheel 1, the segments 5 are provided on their inner sides with inwardly projecting posts 11, the inner ends whereof are formed with concave faces 12 or sockets which are adapted to be applied to the round spokes 2, as indicated most clearly in Fig. 2. At the posts 11 I provide U-bolts 13 which pass around the ends of the posts and enable the posts to be clamped upon the spokes by means of suitable nuts 14. These U-bolts pass through inwardly projecting wings 15 which extend inwardly toward the center of the wheel from the inner sides of the segments, as shown very clearly in Figs. 1 and 2.

The posts 11 are preferably formed on the side faces of the wings 15. The sprocket chain 16 is formed of four rungs or belts, there being two inside or guide belts 17 and two outside or transmission belts 18. These belts are formed of links having the same length and having the same pivot pins 19. The belts 17 are not continuous, but are formed simply of plates or sections 20 which are disposed opposite alternate links 21 in the transmission belts 18. These plates 20 are of substantially rectangular form and project downwardly into the groove 7. Their lower edges are beveled on the outer side so as to conform to the shape of the groove 7, as indicated in Fig. 2. On the inner edges of the links of the belts 18, sprocket teeth 22 are formed which are adapted to engage with the sprocket teeth 6 of the sprocket wheel in a well understood manner. With this arrangement, it should be understood that the chain will operate effectively to transmit a rotary movement to the sprocket wheel. At the same time, the links or plates 20 which project into the groove 7, effectively prevent any possibility of the chains being disconnected from the sprocket wheel by a lateral movement.

Having thus described my invention, I claim as new and desire to secure by Letters Patent:

1. A sprocket wheel having separated rows of teeth with a circumferential groove formed therebetween, in combination with a chain having links with teeth engaging said first teeth, and guide plates disposed between said links and projecting into said groove to prevent the dislocation of said chain.

2. A sprocket wheel having a pair of rows of sprocket teeth and a circumferential groove disposed therebetween, in combination with a chain having links with teeth on the edges thereof engaging said first teeth, pivot pins connecting said links, and guide plates carried by said pivot pins and projecting into said groove to prevent the dislocation of said chain.

In testimony whereof I have signed my name to this specification in the presence of two subscribing witnesses.

ROBERT SAFFORD McINTYRE.

Witnesses:
LAFAYETTE GILL,
FRANCES RAILSBACK.